US006969419B1

(12) United States Patent
Macemon

(10) Patent No.: US 6,969,419 B1
(45) Date of Patent: Nov. 29, 2005

(54) METHOD FOR REMOVING GAS BUBBLES FROM A FLUID-CONTAINING CHAMBER

(75) Inventor: James H. Macemon, Poway, CA (US)

(73) Assignee: Segars California Partners LP, Austin, TX (US)

( * ) Notice: Subject to any disclaimer, the term of this patent is extended or adjusted under 35 U.S.C. 154(b) by 0 days.

(21) Appl. No.: 10/474,101

(22) PCT Filed: May 5, 2000

(86) PCT No.: PCT/US00/12347

§ 371 (c)(1),
(2), (4) Date: Nov. 6, 2001

(87) PCT Pub. No.: WO00/67875

PCT Pub. Date: Nov. 16, 2000

Related U.S. Application Data

(60) Provisional application No. 60/132,859, filed on May 6, 1999.

(51) Int. Cl.[7] ......................... B01D 19/00; B01D 19/02

(52) U.S. Cl. ............................ 95/241; 95/242; 96/155; 96/176; 73/1.06; 134/22.18; 134/169 R

(58) Field of Search .................... 95/241, 242; 96/155, 96/176; 73/1.06, 1.02, 61.41; 128/898, DIG. 6, 128/DIG. 24; 604/407; 134/22.12, 22.18, 134/169 C, 166 R, 169 R

(56) References Cited

U.S. PATENT DOCUMENTS

| | | | | |
|---|---|---|---|---|
| 4,915,713 | A * | 4/1990 | Buzza et al. | 95/266 |
| 5,122,129 | A * | 6/1992 | Olson et al. | 604/240 |
| 5,220,920 | A * | 6/1993 | Gharib | 600/345 |
| 5,329,804 | A * | 7/1994 | Germany et al. | 73/1.06 |
| 5,431,174 | A * | 7/1995 | Knute | 128/898 |
| 5,601,730 | A * | 2/1997 | Page et al. | 210/806 |
| 5,893,382 | A * | 4/1999 | Puppini | 134/22.12 |
| 5,951,870 | A * | 9/1999 | Utterberg | 210/645 |
| 6,544,347 | B2 * | 4/2003 | Lucey et al. | 134/34 |
| 6,712,766 | B2 * | 3/2004 | Harada | 600/459 |
| 2002/0002988 | A1 * | 1/2002 | Ichibakase et al. | 134/22.12 |
| 2002/0017489 | A1 * | 2/2002 | Utterberg | 210/645 |
| 2003/0070923 | A1 * | 4/2003 | Schroeder et al. | 204/400 |
| 2003/0214653 | A1 * | 11/2003 | Palumbo et al. | 356/338 |

FOREIGN PATENT DOCUMENTS

| | | | | |
|---|---|---|---|---|
| JP | 09142419 | A * | 6/1997 | B65B 55/04 |
| JP | 11295221 | A * | 10/1999 | G01N 21/53 |

* cited by examiner

*Primary Examiner*—Duane Smith
*Assistant Examiner*—Douglas J. Theisen
(74) *Attorney, Agent, or Firm*—Michael A. Ervin

(57) ABSTRACT

A method for removing bubbles adhering to the interior wall of a fluid-filled chamber through which a fluid flows, and a related method and apparatus for removing bubbles from a chamber having medical sensory equipment such as a blood gas and chemistry analyzer. The method includes drawing a quantity of gas into the chamber to empty the chamber of fluid, maintaining the chamber in an empty state for a predetermined period of time, and then refilling the chamber with fluid at a rate low enough to remove remaining bubbles and to prevent the formation and trapping of new bubbles within the chamber.

22 Claims, 2 Drawing Sheets

METHOD FOR REMOVING GAS BUBBLES FROM A FLUID-CONTAINING CHAMBER

This application claims the benefit of Provisional Application No. 60/132,859 filed May 6, 1999.

BACKGROUND OF THE INVENTION

This invention relates generally to methods for removing bubbles from chambers, including passageway chambers, containing a liquid, and, more particularly, to a method and apparatus for removing gas bubbles from a liquid-filled chamber having medical sensory equipment such as a blood gas and chemistry analyzer.

Systems for measuring certain chemical characteristics of fluids, e.g., the concentration of certain analytes such as ions, gases and metabolites in human blood, can take the form of blood chemistry diagnostic systems integrated into infusion fluid delivery systems of the kind commonly used in hospital patient care. Such fluid delivery systems infuse nutrients, medications and the like directly into the patient at a controlled rate and in precise quantities for maximum effectiveness. Infusion fluid delivery systems are connected to a patient at an intravascular (IV) port, in which a hollow needle/catheter combination, with an exposed female luer connector, is inserted into a blood vessel of the patient and thereafter an infusion fluid is introduced into the blood vessel at a controlled rate, typically using a peristaltic pump.

Blood chemistry monitoring systems that are combined with infusion delivery systems of this kind use the IV port to periodically withdraw a blood sample back into a fluid measuring chamber along the path of the infusion fluid. Instruments in the chamber perform measurements of blood ion concentrations and the like, and then either discard the blood or reinfuse it into the patient. The system then resumes delivery of the infusion fluid. See, e.g., U.S. Pat. No. 5,431,174, incorporated herein by reference.

During preparation and/or use, small bubbles can be formed within or carried into the fluid measuring chamber of the blood chemistry monitoring system. These bubbles can attach to the walls or other structures of the chamber and affect the performance of sensors designed to measure concentrations of compounds in the fluid. Due to the strength of surface tension at the bubble-to-chamber-wall interface, such bubbles can be very difficult to remove through fluid movement because the force exerted on the bubble by the fluid movement is small compared to the surface tension holding it to the chamber surface.

Rapid fluid movement, either laminar or turbulent, has frequently been used to remove attached bubbles from chamber walls. When the force exerted by the moving fluid on the bubble is greater than the attachment force, the bubble breaks free and can be carried out of the measuring chamber. Unfortunately, the fluid velocity required to achieve this force can be considerable and often exceeds the velocity required for normal operation of the chamber to measure fluids in a sequential manner. Furthermore, any increase in fluid pumping rate usually increases the local pressure at a bubble, reducing its size and cross sectional area, reducing the resultant force from the moving fluid. Thus, fluid pumps must be sized considerably larger than would otherwise be required, leading to increased size, complexity, and cost.

Other methods of bubble removal have involved improvements in the design of the measuring chamber shape for high velocity flow at relatively low fluid pumping rates. Also, use of materials or chamber surface treatments that reduce the surface tension strength, thus enabling lower pumping rates to dislodge the bubble, have been shown to be effective. However, pumps, fluid chambers and pathways of a measurement system for intravenous use must be manufactured and maintained in a sterile and non-toxic condition. These restrictive design requirements limit the choice of materials that can be used in the fluid path, the design and performance of the fluid pumping system, and the complexity of the measurement chamber. Furthermore, sensor size, shape, and design details required for cost effective manufacture and use can preclude these otherwise desirable chamber design characteristics.

This is particularly true for apparatus designed to perform the fluid and body fluid measurements outside of the laboratory, with analyzers that have been designed to be portable and can be operated by personnel with less training. Often, compromises in pumping system performance and measurement system cost and complexity are required to meet such portability, operating cost, and ease-of-use requirements.

In dealing with a separate problem, it is known that the slow removal of a fluid-aspiration-and-dispense tip from a fluid will remove small droplets of fluid that might otherwise cling to the exterior surface of the tip. This technique is often referred to as a "pool wipe." This technique is typically limited to external probes used to aspirate and dispense fluids from open vessels.

Some or all of these difficulties apply generally to other apparatus suffering from bubbles in chambers, including passageway chambers, containing a fluid. Thus, while the present invention can be understood as a method for removing gas bubbles from a liquid-filled chamber having medical sensory equipment such as a blood gas and chemistry analyzer, it should also be understood more generally as method of removing bubbles in chambers, including passageway chambers, containing fluid.

Thus, there has existed a definite need for a method and/or an apparatus to remove small bubbles from a chamber. Such an invention will preferably provide for sensor measurements to be performed with minimum risk of error due to bubbles. The present invention satisfies these and other needs, and provides further related advantages.

SUMMARY OF THE INVENTION

The present invention provides a method and/or apparatus to remove bubbles from a chamber, and in the preferred embodiment, a method and/or apparatus to prepare sterile medical sensory equipment, in a chamber within a housing, for use by removing bubbles from the chamber and running calibration fluid through the chamber. Such an invention will provide for sensor measurements to be performed with minimum risk of error due to bubbles.

The method entails removing substantially all the liquid from the chamber. The remaining liquid in the chamber is in the form of bubble surfaces and/or droplets. The method further entails refilling the chamber with liquid at a rate slow enough to allow the surface tension of the advancing liquid to capture the liquid forming the surfaces of the bubbles and/or droplets.

Embodiments of the method may advantageously clean the chamber of bubbles without the need for high speed and/or turbulent fluid flow. Furthermore, embodiments of the method may not require special surface treatments or chemicals. Naturally, other methods can be combined with the above method in some embodiments.

Preferably, the invention further comprises leaving the chamber empty for a period of time after the completion of the step of removing and prior to the start of the step of refilling. This advantageously allows bubbles to weaken or pop, improving the effectiveness of the system.

The liquid is preferably removed from the chamber by a pump that is connected to an orifice in the bottom of the chamber, and the chamber preferably fills with gas from an orifice in the top of the chamber. Additionally, the rate that the chamber is refilled is selected to avoid internal splashing that could cause additional bubbles and liquid droplets. This advantageously helps prevent new bubbles forming in the chamber.

In some embodiments, this invention resides in a method of using a multi-compartment assembly for delivering and collecting fluids used in calibrating an apparatus. The method is particularly useful as part of a procedure to warm-up and calibrate sensors in an infusion delivery-based blood chemistry monitor prior to use.

More particularly, the method of the present invention includes providing calibration fluid in a closed calibration container disposed within a bag that includes a connector for conveying fluids between the interior of the bag and a conventional intravascular tube. The calibration container is opened and the calibration fluid is withdrawn from the container to the intravascular tube, through the connector, without mixing the calibration fluid with any fluids in a remaining volume of the bag. Subsequently, the calibration fluid is transferred from the intravascular tube to the bag's interior, again through the connector.

In other, more detailed features of the invention, the multi-compartment fluid assembly also includes a sampling tube within the bag, for conveying fluids to the connector. The calibration fluid is transferred from the calibration container to the intravascular tube by inserting the sampling tube into the calibration container and transferring the calibration fluid through the sampling tube to the connector. Other features of the invention include providing one or more additional calibration fluids in additional calibration container(s) located in the bag, and delivering and collecting the additional calibration fluid using the same method as used for the first calibration fluid. Another feature includes transferring of infusion fluid into the bag's interior through the connector, prior to opening the first calibration container.

Other features and advantages of the invention will become apparent from the following detailed description of the preferred embodiments, taken in conjunction with the accompanying drawings, which illustrate, by way of example, the principles of the invention.

DETAILED DESCRIPTION OF THE PREFERRED EMBODIMENTS

Figure 1:
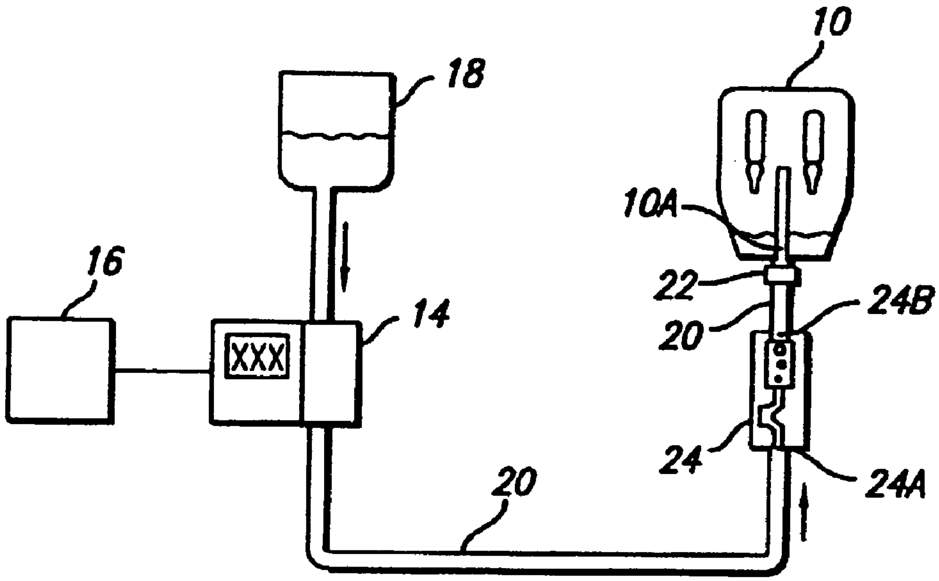
FIG. 1 is a schematic diagram of a multi-compartment fluid assembly shown connected to a combination infusion fluid delivery and blood chemistry analysis system for warm-up, bubble removal and calibration of the system.

An apparatus employing a method of removing bubbles from a chamber or passage according to the present invention is shown in FIG. 1. The system includes a multi-compartment fluid assembly 10 for use in effecting the sterile transfer of calibration fluids and sterile air (or some other sterile gas) to and from an infusion fluid delivery and blood chemistry analysis system. The analysis system includes an infusion pump 14, preferably being controlled by a controller 16, which pumps infusion fluid from a fluid source 18 through the analysis system via an intravascular tube 20 and to a male luer connector 22. The pump and controller may be integrated together as a unit.

An electrode array housing 24 is located in the middle of the intravascular tube 20 and arranged such that the infusion fluid passes through a chamber defined within the housing on its way to the male luer connector 22. The chamber has a first orifice 24A in fluid communication with the infusion pump 14 through one part of the intravascular tube, and it has a second orifice 24B in fluid communication with an orifice 10A in the multi-compartment fluid assembly 10 through the other part of the intravascular tube.

The chamber contains medical sensors. For the case of electrochemical sensors, the instruments in the chamber typically include an electrode array having a reference electrode and a plurality of sensor electrodes that are each sensitive to a particular ion of interest. An example of an electrode array of this type is shown in U.S. Pat. No. 5,220,920. When an electrode array of this type is used to measure the concentration of various gases in a patient's blood, it is important that the electrode array be free of excessive bubbles.

For an electrode array of this type, it is also important for the array to be stabilized and for the infusion fluid to have a temperature very close to the normal patient temperature. This ordinarily necessitates a lengthy stabilization and warm-up period prior to the infusion of fluids into the patient. Accordingly, during the stabilization and warm-up period, which is typically about 10 minutes (depending on the stabilization fluid), a heated infusion fluid is passed through the electrode array chamber and then discarded. Further, near the end of the period, a calibration fluid must be passed through the electrode array chamber, to properly calibrate the sensor electrodes, and then discarded. Throughout this entire procedure, sterility must be maintained.

The analysis system is configured such that during warm-up and calibration of the analysis system, the male luer connector 22 is connected to the multi-compartment fluid assembly 10. Afterward, the male luer connector is inserted in a female luer connector (not shown) at the end of an IV port that is connected to a patient's arm.

During use of the analysis system on a patient, the controller 16 periodically conditions the pump 14 to interrupt its pumping of the infusion fluid to the patient and, instead, to reverse direction and draw a blood sample from the patient. This blood sample is drawn rearwardly through the intravascular tube 20 at least as far as (and into) the electrode array housing 24, to allow certain characteristics of the blood to be measured. After the measurements have been completed, the pump reinfuses the blood sample back into the patient and then resumes pumping the infusion fluid.

Figure 2:
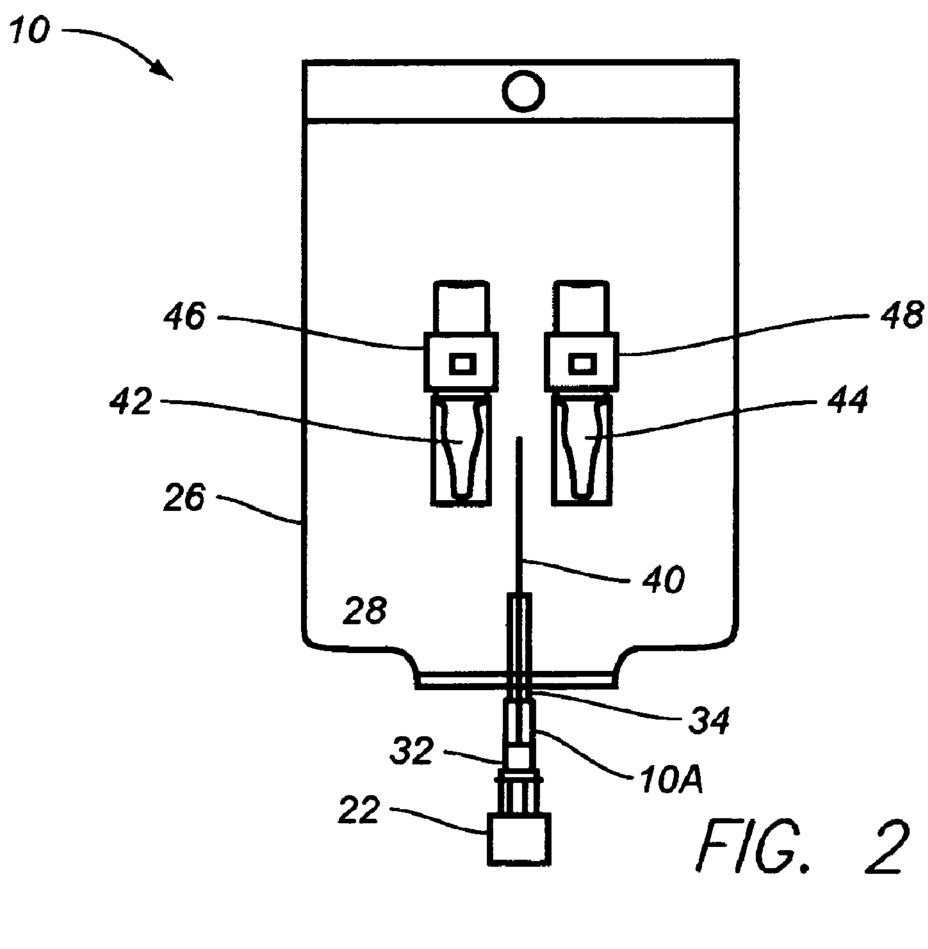
FIG. 2 is a cross-sectional view of a multi-compartment fluid assembly, depicted in FIG. 1, and used in performing the preferred method of the invention.

The multi-compartment fluid assembly 10 is depicted in greater detail in FIG. 2. The assembly includes a bag 26 that is preferably formed of plastic sheet material, which may be either in the form of a sleeve or in the form of two plastic sheets that are peripherally heat sealed to create a seam 28. The plastic sheets may be made of any appropriate plastic material. A preferred material is high tear strength polyvinyl chloride (PVC). Moreover, the bag is preferably transparent, to permit the user to easily view its contents.

The bag 26 includes a connector for fluid communication between the interior of the bag and the male luer connector of a conventional intravascular tube, such as the intravascular tube 20 of FIG. 1. In the preferred method, the connector is a female luer connector 32 (defining the bag's orifice 10A) that is attached to a PVC connecting tube 34 which passes through and is heat sealed to an upper portion of the bag's seam 28. The multi-compartment fluid assembly 10 also includes a sampling tube 40 located within the bag 26 and in fluid communication with the female luer connector 32 through the connecting tube 34. In the preferred method, the sampling tube is a rigid tube that extends downwardly from the connecting tube, in a portion of the bag's interior. A suitable filter material (not shown) may be disposed in the connector 32, to prevent debris from passing into or out of the bag 26.

The bag 26 contains sterile air (or some other sterile gas) for use in removing bubbles from the chamber of the electrode array housing. Also, first and second closed calibration containers 42 and 44, respectively, are disposed within the interior of the bag 26. The containers preferably take the form of breakable glass ampules. These calibration containers store calibration fluids that can be used to calibrate the electrode array. The calibration containers are secured within the bag by PVC tubes 46 and 48 that are heat sealed on the side of the bag. The tubes assist in securing the containers when the multi-compartment fluid assembly 10 is being transported and in use. This is particularly important when the calibration containers are formed of glass or otherwise are susceptible to breakage by hitting each other.

The multi-compartment fluid assembly 10 described above is used not only to calibrate and warm-up the infusion fluid delivery and blood chemistry analysis system in a sterile environment, it is also used to remove bubbles from the interior of the chamber (and the nearby components). Initially, the male luer connector 22 is inserted into the bag's female luer connector 32 to provide fluid communication between the orifice 10A, leading to the interior of the bag 26, and the intravascular tube 20.

Warming and stabilizing the electrode array typically takes about 10 minutes. During this warm-up period, fluid is being pumped by the infusion pump 14 through the electrode array housing 24 under the control of the software and/or hardware of the controller 16. The heated infusion fluid is transferred from the intravascular tube 20 into the interior of the bag 26 through the male luer connector 22, the female luer connector 32 and the connector tube 34. The infusion fluid can be stored in the sealed bag and discarded later.

During assembly and connection of the apparatus, and during the warm up period, bubbles can form on and/or lodge in the interior of the electrode array housing's chamber. The method of the invention is then used to remove the bubbles from the chamber. In particular, the bubbles are removed by emptying the chamber of liquid, and the slowly refilling it.

Preferably, before and after the electrode array has warmed up, the pump 14 draws fluid back from the electrode array chamber while the sampling tube 40 allows the air or another sterile gas to be drawn (or otherwise caused to slowly enter) into the chamber. The air preferably enters the chamber through the second orifice 24B from the top of the chamber (with respect to gravity), displacing the fluid in the chamber through the first orifice 24A in the bottom of the chamber until the chamber is empty. After preferably waiting period of time so as to allow some remaining bubbles to burst, while others are allowed to become more fragile, the fluid is pumped or otherwise caused to slowly refill the chamber, preferably from the bottom. This slow filling action causes the surface tension from the rising air-liquid interface to clean the chamber surface, capturing and removing any remaining bubbles. An advantage of this method is that the fluid is pumped slowly, so pump design can be optimized for normal performance rates and does not need to be over-designed to accommodate rapid fluid pumping to remove trapped bubbles.

Preferably, the controller 16 includes hardware and/or software configured to condition the pump 14 to reverse direction and draw the air into the chamber, wait a selected period of time, and then slowly pump the liquid to refill the chamber.

In other preferred embodiments of the invention where the fluid path is maintained in a sterile condition, the volume of gas used to fill the chamber would be drawn from either some other reservoir of sterile gas or through a filter that maintains sterility.

Additionally, while it is preferred to replace the fluid with a gas, it is within the broadest scope of the invention to use any other fluid (i.e., a liquid or a gas) (e.g., blood), where the other fluid provides the desired functional results. Preferably the other fluid has a substantially different surface tension and/or low mixability with the first fluid (which is a liquid). Furthermore, it is understood that drawing the first liquid out of the chamber, even without allowing another fluid or gas to enter the chamber, can be within the broadest scope of the invention.

While the waiting time is preferably a short, predetermined period of time, other variations are within the scope of the invention. For example, the waiting time could be determined by observing the condition of the bubbles within the chamber, or calculated based on other variables (such as the time constraints of the patient's course of treatment). Likewise, because a certain delay is experienced by any portion of the chamber as the areas below it are emptied and refilled, it would be within the scope of the invention to have no delay between the pump's drawing the fluid out and the pump's pumping the fluid back in (i.e., there could be no waiting period between the removal of the liquid and the replacement of the liquid). Indeed, by "overdrawing" the air into the chamber (i.e., drawing some air in past the chamber), a pause (waiting time) is effected even without pausing the pump.

The slow filling rate for bubble removal in the above process will generally be empirically determined for optimal bubble removal. The rate will typically be selected to be a compromise between the preferred bubble removal speeds and the time delay which may adversely affect normal use of the chamber as part of a measurement and analysis system. For one exemplary system, where a typical purge rate during warm up is 900 ml/hr, and where a typical patient infusion rate might be 5 ml/hr, a preferred slow refill rate might be conducted at 150 ml/hr.

Each of the electrodes in the electrode array housing 24 includes an electrochemical sensor which develops an electrical signal that varies in accordance with a predetermined parameter of the blood to which the electrochemical sensor is sensitive. Examples of parameters that are commonly measured in this fashion include pH, concentrations of sodium, potassium and calcium, and glucose, hematocrit, and partial pressures of oxygen (pO.sub.2) and carbon dioxide (pCO.sub.2). However, prior to measurement of these parameters, a special calibration fluid must be passed through the electrode array housing's chamber so that the electrodes can be properly calibrated.

Accordingly, the multi-compartment fluid assembly 10 is provided with the closed first calibration container 42 and the closed second calibration container 44, containing a first calibration fluid and a second calibration fluid, respectively. When it is desired to pass a calibration fluid through the electrode array housing 24, generally at a time near the end of the warm-up period after the bubbles have been removed from the chamber, the first calibration container is opened. Then the first calibration fluid is withdrawn from the first calibration container to the intravascular tube 20, through the connecting tube 34 and the female luer connector 32, without mixing the first calibration fluid with the infusion fluid in a remaining volume of the bag.

More specifically, after the first calibration container 42 has been opened, the sampling tube 40 is inserted into the first calibration container and the first calibration fluid is withdrawn through the sampling tube to the connector tube 34 and the female luer connector 32. In the preferred method, the controller 16 conditions the pump 14 to reverse direction and draw the first calibration fluid from the first calibration container. This calibration fluid is drawn rearwardly through the intravascular tube 20 as far as the electrode array housing 24, to calibrate the sensor electrodes in the array. The filter material disposed in the female luer connector 32 prevents any minute glass shards from the broken calibration container 42 from exiting the bag's interior.

After sufficient time to enable the electrode array to be calibrated, the controller 16 conditions the pump 14 to reverse direction again and transfer the first calibration fluid from the intravascular tube 20 through the male luer connector 22 to the bag's interior through the female luer connector 32 and the connector tube 34.

If the calibration fluid is not functionally sensitive to exposure to the sterile gas being used to remove the bubbles from the chamber, the steps of calibrating and remiving bubbles can be combined. In such a case, the calibration fluid can be drawn down into and through the chamber, drawing the bubble-removing gas behind it. The calibration fluid can then be slowly pumped back to the chamber, removing the bubbles and drops from the chamber. With the chamber's bubbles removed by the calibration fluid, the calibration fluid can then be used to calibrate the sensors. Finally, the calibration fluid is pumped out of the chamber and out into the bag. Naturally, if the sensors are configured to detect gaseous content, and if the calibration fluid's gaseous content would change from exposure to the bubble-removing gas, then this variation of the invention would not be appropriate.

If a second calibration is required, the second calibration container 44 is opened and the second calibration fluid is withdrawn from the second calibration container to the intravascular tube 20, through the connecting tube 34 and the female luer connector 32, without mixing the second calibration fluid with the infusion fluid in a remaining volume of the bag. Again, after sufficient time to enable the electrode array to be calibrated, the second calibration fluid is transferred from the intravascular tube 20 through the male luer connector 22 to the bag's interior through the female luer connector 32 and the connector tube 34.

After the sensor array 24 has had the bubbles removed, been properly calibrated and the warm-up period has concluded, the male luer connector 22 is withdrawn from the female luer connector 32 and inserted into the patient's IV port (not shown). The multi-compartment fluid assembly 10, with its charge of used sterile air, infusion fluid and calibration fluid, is then disposed of.

Figure 3:
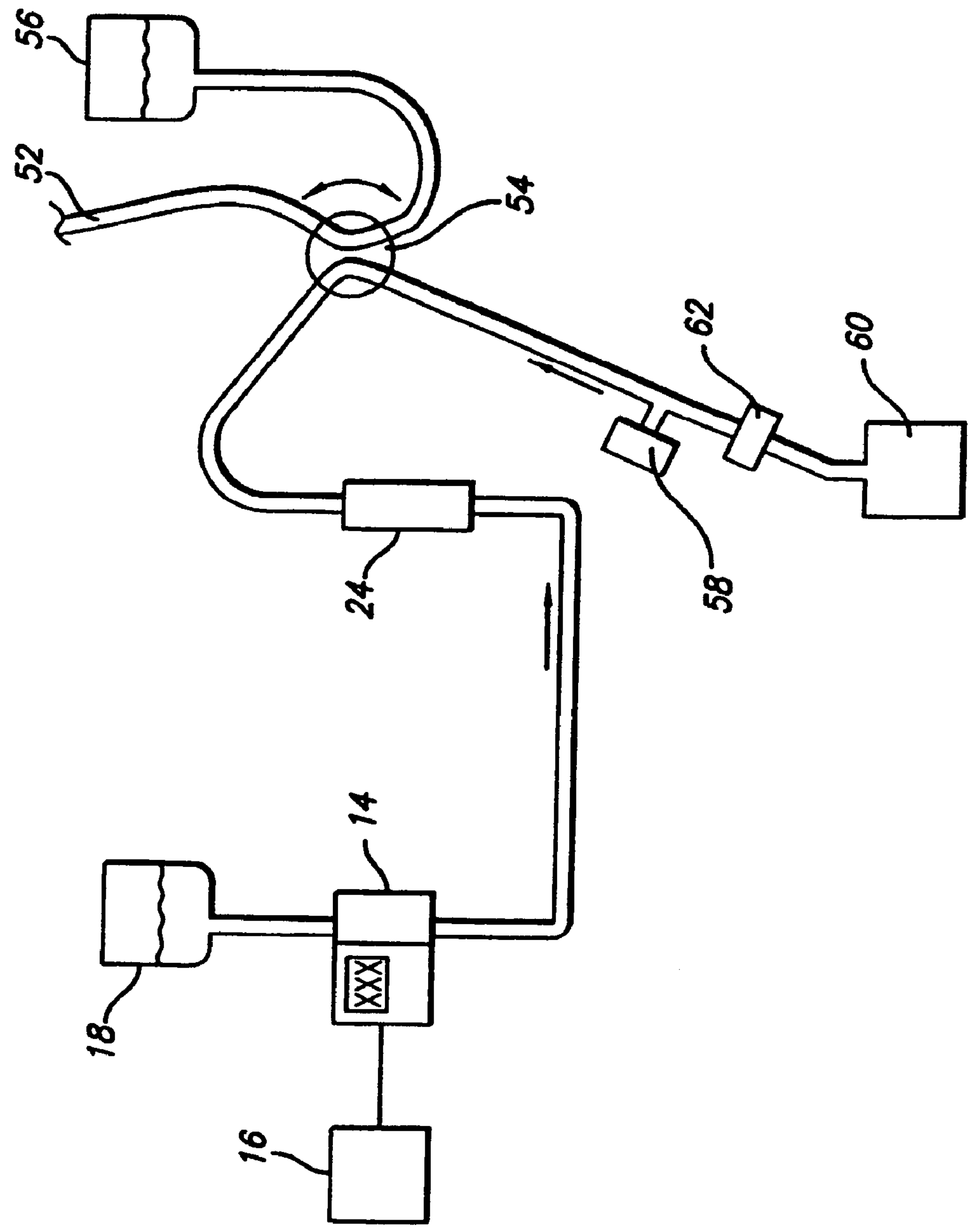
FIG. 3 is a schematic diagram of a combination infusion fluid delivery and blood chemistry analysis system connected to another IV-type device.

With reference to FIG. 3, it is noted that the present invention can be implemented using a shared port to a patient. This type of arrangement, where the port 52 to the patient is alternately connectable via a valve 54 (with four luer fluid connectors) between another system such as an IV fluid device 56 and the system of the present invention (with the pump 14, controller 16, fluid source 18 and electrode array housing 24), could be used similarly to the first with respect to the inventive method. However, it should be noted that it also could be configured such that the system can be connected to a source of filtered air such as a hydrophobic filter air vent 58, with a waste reservoir 60 that is isolated by a one-way valve 62 so that bubbles can be repeatedly removed from the system while still being hooked up to the patient. In particular, between times when the patient's blood is being examined in the chamber, the valve can be switched such that the air can be drawn in through the vent to remove bubbles, and the fluid used to remove the bubbles can be diverted to the waste reservoir.

Fundamentally, the preferred method comprises the steps of:

a) Slowly removing the fluid from a chamber, preferably from the bottom, causing the chamber to fill with gas, preferably from the top.

b) Leaving the chamber empty for a short and predetermined period of time while most bubbles trapped in the chamber burst. This time interval will be empirically determined and is typically a function of the fluid, chamber material, and chamber shape.

c) Slowly refilling the chamber with fluid, preferably from the bottom, at an empirically determined rate slow enough to 1) avoid internal splashing that might cause additional bubbles and liquid droplets that could trap bubbles and 2) cause the surface tension of the advancing gas-liquid interface to capture and remove remaining bubbles and liquid droplets.

In the preferred sterile sensor system, it should be appreciated from the above description that the present invention provides an improved method for removing bubbles from chambers, including passageway chambers, and thereby, for delivering and collecting fluids used in calibrating an apparatus. By using sterile air in a sealed bag, the infusion fluid that passed through the infusion fluid delivery and blood chemistry analysis system can be efficiently collected and disposed of in a sealed bag or reservoir. Additionally, the electrode array is fully cleaned of bubbles and calibrated while maintaining complete sterility of the calibration fluid and the sensor electrodes.

From the foregoing description, it will be appreciated that the present invention provides a method for removing gas bubbles from chambers, including passageway chambers, containing fluid, and, more particularly, a method and apparatus for removing bubbles from a chamber having medical sensory equipment such as a blood gas and chemistry analyzer.

While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

I claim:

1. A method for removing bubbles from a chamber containing a liquid, comprising:

removing substantiality all the liquid from the chamber, wherein the removed liquid leaves behind enough liquid to form the surfaces of the bubbles; and refilling the chamber with liquid at a rate slow enough to allow the surface tension of the advancing liquid to capture the liquid forming the surfaces of the bubbles, thereby removing the bubbles.

2. The method of claim 1, wherein the liquid is removed from the bottom of the chamber in the step of removing.

3. The method of claim 1, wherein the chamber to fills is filled with a fluid that is different from the liquid during the step of removing.

4. The method of claim 3, wherein the fluid that is different from the liquid is a gas.

5. The method of claim 4, wherein the liquid is removed from the bottom of the chamber and the chamber fills with gas from the top of the chamber in the step of removing.

6. The method of claim 1, wherein the chamber is refilled with liquid from the bottom of the chamber in the step of refilling.

7. The method of claim 1, wherein, in the step of refilling, the rate that the chamber is refilled is an empirically predetermined rate.

8. The method of claim 1, wherein, in the step of refilling, the rate is selected to avoid internal splashing that could cause additional bubbles and liquid droplets.

9. The method of claim 1, and further comprising leaving the chamber empty for a period of time after the completion of the step of removing and prior to the start of the step of refilling.

10. The method of claim 9, wherein the length of the period of time is selected such that most bubbles in the chamber burst during that period of time.

11. The method of claim 9, wherein the length of the period of time is empirically predetermined.

12. The method of claim 9, wherein the liquid is removed from the bottom of the chamber in the step of removing.

13. The method of claim 9, wherein the chamber is filled with a fluid that is different, from the liquid during the step of removing.

14. The method of claim 13, wherein the fluid that is different from the liquid is a gas.

15. The method of claim 14, wherein the liquid is removed from the bottom of the chamber and the chamber fills with gas from the top of the chamber in the step of removing.

16. The method of claim 9, wherein the chamber is refilled with liquid from the bottom of the chamber in the step of refilling.

17. The method of claim 9, wherein, in the step of refilling, the rate that the chamber is refilled is an empirically predetermined rate.

18. The method of claim 9, wherein, in the step of refilling, the rate is selected to avoid internal splashing that could cause additional bubbles and liquid droplets.

19. The method of claim 1, and further comprising leaving the chamber empty for a period of time after the completion of the step of removing and prior to the start of the step of refilling, wherein:

the liquid is removed from the bottom of the chamber and the chamber fills with gas from the top of the chamber in the step of removing; and the chamber is refilled with liquid from the bottom of the chamber in the step of refilling.

20. An apparatus for removing gas bubbles from a sterile, liquid-filled chamber having medical sensory equipment, comprising:

a housing forming the chamber containing the medical sensory equipment, wherein the chamber has a first orifice and a second orifice;

a pump configured to pump fluid, the pump being in fluid communication with the first orifice;

a controller configured to direct the pump to pump liquid into and draw liquid out of the chamber; and a source of sterile gas in fluid communication with the second orifice, configured such that the sterile gas is drawn into the chamber when the liquid is drawn out of the chamber by the pump;

wherein the controller is configured to direct the pump to pump substantially all the liquid from the chamber, the removed liquid leaving behind enough liquid to form surfaces of the bubbles; and wherein the controller is configured to direct the pump to refill the chamber with liquid at a rate slow enough to allow the surface tension of the advancing liquid to capture the liquid forming the surfaces of the bubbles.

21. A method for preparing sterile medical sensory equipment, in a chamber within a housing, for use, comprising:

providing liquid along a passage extending sequentially through a first orifice in the housing's chamber, out of a second orifice in the housing's chamber, and to an orifice in a sterile container that contains a sterile gas and an isolated portion of calibration fluid;

configuring the sterile container such that the sterile gas can be withdrawn from the sterile container's orifice;

withdrawing liquid to cause the sterile gas in the sterile container to be drawn into the housing's chamber;

pumping liquid into the first orifice in the housing's chamber, out of the second orifice in the housing's chamber, and into the orifice in the sterile container, so as to return the sterile gas to the sterile container, wherein the liquid is pumped at a rate slow enough to allow the surface tension of the advancing liquid to capture any liquid forming the surfaces of bubbles in the chamber;

configuring the sterile container such that the isolated portion of calibration fluid can be withdrawn from the sterile container's orifice;

withdrawing liquid from the first orifice of the housing's chamber to cause the calibration fluid in the sterile container to be drawn into the housing's chamber;

taking calibration readings using the medical sensory equipment; and pumping liquid into the first orifice in the housing's chamber, out of the second orifice in the housing's chamber, and into the orifice in the sterile container, so as to return the calibration fluid to the sterile container, thereby preparing sterile medical sensory equipment.

22. The method of claim 21, wherein the step of withdrawing liquid to cause the sterile gas in the sterile container to be drawn into the housing's chamber occurs before the step of withdrawing liquid from the first orifice of the housing's chamber to cause the calibration fluid in the sterile container to be drawn into the housing's chamber.

* * * * *